(12) United States Patent
Hennessey et al.

(10) Patent No.: US 6,487,307 B1
(45) Date of Patent: Nov. 26, 2002

(54) SYSTEM AND METHOD OF OPTICALLY INSPECTING STRUCTURES ON AN OBJECT

(75) Inventors: Kathleen Hennessey, Lubbock, TX (US); Youling Lin, Dallas, TX (US)

(73) Assignee: ISOA, Inc., Richardson, TX (US)

( * ) Notice: Subject to any disclaimer, the term of this patent is extended or adjusted under 35 U.S.C. 154(b) by 0 days.

(21) Appl. No.: 09/262,603

(22) Filed: Mar. 4, 1999

Related U.S. Application Data (63) Continuation-in-part of application No. 08/998,315, filed on Dec. 24, 1997, now Pat. No. 6,014,461, which is a continuation of application No. 08/347,020, filed on Nov. 30, 1994, now abandoned.

(51) Int. Cl.$^7$ .............................. G06K 9/03; G06K 9/46; G06K 9/52; G06T 7/60; G21N 21/88
(52) U.S. Cl. ........................ 382/149; 382/199; 382/203; 382/224; 356/394; 356/448; 356/237.5
(58) Field of Search ................................ 382/145, 149, 382/151, 141, 199, 203–204, 224; 356/237.2, 237.3, 237.4, 237.5, 394, 448

(56) References Cited

U.S. PATENT DOCUMENTS

| 5,544,256 | A | * | 8/1996 | Brecher et al. | 382/149 |
| 5,923,430 | A | * | 7/1999 | Worster et al. | 356/237.2 |
| 6,091,846 | A | * | 7/2000 | Lin et al. | 382/145 |
| 6,122,397 | A | * | 9/2000 | Lee et al. | 382/141 |
| 6,205,239 | B1 | * | 3/2001 | Lin et al. | 382/149 |
| 6,246,788 | B1 | * | 6/2001 | Pattikonda et al. | 382/149 |
| 6,292,260 | B1 | * | 9/2001 | Lin et al. | 356/237.4 |
| 6,292,582 | B1 | * | 9/2001 | Lin et al. | 382/145 |

* cited by examiner

Primary Examiner—Scott Rogers
(74) Attorney, Agent, or Firm—Steven W. Smith (57) ABSTRACT

A system and method of optically inspecting a structure on a surface of a production object which is supported on a moving inspection platform. The method reliably traces structure edges and stores structure and structure island characteristics. The system uses a camera and a light or energy source to sharply delineate the structure edges. A sequence of images of the object and the structure are captured, and the structure is detected in each image. The structure is then symbolically decomposed into primitives, and a histogram is produced for each image identifying the slope and length of each edge of the structure. The histograms are compared in each image, and are aligned to eliminate differences due to wobble of the inspection platform or differences in magnification. A production structure grammar is then produced from the aligned images. The production structure grammar is compared to a reference structure grammar generated from a defect-free object. Differences in the two grammars, if any, are used to identify missing, misaligned, or misoriented structures on the production object, and to detect foreign objects and other defects.

19 Claims, 7 Drawing Sheets

FIG. 7B

SYSTEM AND METHOD OF OPTICALLY INSPECTING STRUCTURES ON AN OBJECT

RELATED APPLICATIONS

This Patent Application is a Continuation-in-Part of co-owned U.S. patent application Ser. No. 08/998,315, filed Dec. 24, 1997, now U.S. Pat. No. 6,014,461, entitled, "System and Method for Automatic Knowledge-Based Object Identification," which is a Continuation of U.S. patent application Ser. No. 08/347,020, filed Nov. 30, 1994, now abandoned.

BACKGROUND OF THE INVENTION

1. Technical Field of the Invention

The present invention relates to the inspection of structures on an object and, more specifically, to a system and method for optically inspecting structures on an object.

2. Description of Related Art

An example of a useful application of the present invention is the inspection of semiconductor wafers (wafers) during and after the manufacturing process. In order to transform a wafer into a microprocessor or other electronic device, the wafer undergoes several manufacturing steps. First, a wafer is cut from a crystal ingot (such as crystallized silicon), and an expitaxial layer (a single layer of silicon crystals) is then grown thereon. The creation of an expitaxial layer is often followed by the growth of high quality oxides on the wafer surface, in a process called oxidation. Next, the wafer undergoes several fabrication steps. Each fabrication step places a layer of ions, or other materials, in the wafer or on the wafer in a predetermined geometric pattern so as to form a portion of an electronic circuit. When the fabrication steps are completed, the wafer surface typically possesses several functional microelectronic devices separated into a plurality of dice.

Common fabrication steps include chemical vapor depositions (CVD), plasma vapor depositions (PVD), etches, ion implantations, diffusions, metalizations, or the growth of structures directly on the wafer. The successful completion of each of these fabrication steps depends largely on the ability to precisely control the geometric placement of gasses, ions, metals, or other deposition materials through etching, implanting, etc., with sub-micron precision. The precise placement of ions, metals, gasses, or other deposits is achieved through a process called photolithography. Though photolithography is well known in the art of microelectronic device manufacturing, a brief description of photolithography is provided so that the reader may more clearly understand the invention.

Photolithography is a pre-fabrication process in which a pattern is transferred from a negative known as a mask (also called a retical) onto a wafer using a technique similar to film development in photography. Photoresist contains photoactive sensitizers, and in a step called imaging, light or other activating illumination produces a chemical change in the photoresist exposed to the light. The first step in photolithography is the preparation of the wafer. The wafer is cleaned, and a liquid photoresist is distributed evenly across the top surface of the wafer. The photoresist is dried, and then the wafer with the photoresist thereon is heated to vaporize any solvents. The mask's pattern, like a photographic negative, is projected onto one portion of the wafer at a time by a precision optical device known as a "stepper", and is preserved on the wafer by the photoresist. Each area of the wafer that is to become a separate device is called a "die". After illumination with the mask's pattern, a solvent washes away either the exposed portions of "positive" photoresist, or another solvent washes away the unexposed portions of "negative" photoresist. This process, called development, leaves the geometric pattern of the mask, or its negative, on each die.

When fabrication is complete, the electrical characteristics of each die are tested. Based on the results of these tests, the die are "binned" (i.e., they are classified as good or defective). The wafer is then sliced into separate dice which are sorted to discard defective ones. The good dice are then prepared for packaging.

During the imaging step, the photoresist is exposed to a light source at a predetermined wavelength. So called "positive" photoresist is made soluble by exposure to light, such that the area of the photoresist exposed to light (or other illumination) washes away from the wafer when the photoresist is rinsed with a predetermined solvent. The result is that a direct duplicate image of the mask is left on the semiconductor wafer in the form of "photoresist structures" which constitute a developed photoresist layer. Though various types of photoresist are available, because so-called "positive" photoresist is preferred for small devices, the remaining discussion will address the use of positive photoresist (hereinafter "photoresist").

By covering portions of the semiconductor wafer with photoresist structures, the entire wafer can, in a fabrication step, be exposed to various chemicals, ions, metals, or etchings without affecting the entire areas under the photoresist structures. After the fabrication step has been completed, a wash step is executed. In the wash step, the remaining photoresist is washed away and the wafer is cleaned. Should another fabrication step be desired, the wafer may undergo another photolithography process. Accordingly, in order to correctly manufacture microelectronic devices, geometrically correct patterns of photoresist structures must be deposited either on or in the wafer during fabrication. And, correct geometric patterning is dependent upon properly imaging and developing photoresist layers.

Each fabrication step is expensive, and adds significant value to the wafer. Furthermore, fabrication steps are difficult and costly to reverse. By contrast, photoresist structures can be removed quickly and with minimal disturbance to the underlying wafer structures. Thus, it is desirable to detect defects in the developed photoresist prior to the fabrication step. Defects are those anomalies which impair or alter electrical characteristics of the die when fabrication is complete, causing the die to be discarded. If a defect is detected in the developed photoresist layer, one simply washes away the photoresist structures and applies another photoresist layer in place of the defective photoresist layer. The most common method used to detect imperfections in a developed photoresist layer is optical inspection. Electronic, ion beam, or X-ray imaging is also available; however, because these imaging techniques illuminate and reconstruct only one point at a time, they are slower and more expensive than optical inspection. Laser imaging techniques capture and compare the angle of reflection of laser beams; however, they lack precision in reporting the position of defects.

Optical inspection devices typically employ a wafer support which holds a wafer under an overhead camera and multiple light sources. In operation, the optical inspection device lights the wafer from several directions in order to fully illuminate the wafer, and the overhead camera captures a gray-scale (black-and-white) image of the wafer with a developed photoresist layer thereon. In a process commonly called convolution, this image is then sent to a computer which compares the image, pixel by pixel, to a stored image of a wafer with a properly constructed photoresist layer thereon. If any differences between the captured image and the image of the wafer with a properly constructed photoresist layer are detected, the computer has detected a defective photoresist layer.

The existing method of optically inspecting a developed photoresist layer has several disadvantages. First, because the information for each pixel must be stored in memory, the present method of optical inspection requires a large amount of memory. Furthermore, since existing optical inspection devices compare images pixel by pixel, they are very slow.

In order to overcome the disadvantages of the existing methods of inspecting photoresist, it would be advantageous to have a system and method of optically inspecting a developed photoresist layer for defects, such as alignment errors, missing photoresist structures, contamination, and skewed photoresist. Ideally, the photoresist defect detection system should be able to reliably detect and assess the location of photoresist structures, such as photoresist islands, which constitute a developed photoresist layer. In addition, it would also be advantageous for such a system to operate more quickly than convolution techniques. The present invention, when utilized for semiconductor inspection, provides such a system and method.

SUMMARY OF THE INVENTION

The present invention is a system for inspecting structures on an object. The system comprises a support which supports the object, a device which emits light or energy on a surface of the object to illuminate the surface and the structures thereon, an image capturing device mounted adjacent the support for acquiring an image of the surface of the object or a portion thereof, and a computer which generates a set of high level descriptors referred to as structure grammar from the image. Structure grammar includes the high level descriptors for a particular structure that have common characteristics including relevant features such as size, shape, color, sharpness, and the like.

The computer compares the structure grammar generated from the image to a structure grammar for a defect-free object (or a defect-free portion of the object) and records any differences in the two grammars. Thus, the defect-free object grammar may be generated from computer aided drafting or from an image of a defect-free object. The computer also performs Automatic Defect Classification (ADC). In addition, a knowledge base accessible by the computer receives and stores structure grammar generated from defect images.

The device which emits light or energy on a surface of the object may emit, for example, laser light, X-rays, ion beams, electrons, or light in the infrared, ultraviolet, or visible spectrum. In addition, the image capturing device could be a line scan or an area scan camera.

In another aspect, the present invention is a method of inspecting an object with a structure thereon which has a surface and at least one edge of the surface. The method includes the steps of shining a light or energy on the object having the structure thereon (the light illuminating the surface so as to clearly illuminate the edges of the structure), capturing an image of the object or a portion thereof, producing a set of primitives for the edges of the structure, and comparing the primitives to a corresponding set of primitives generated from a defect-free object or portion thereof.

The method of inspecting a structure may accommodate structures which have a plurality of edges. In this case, the method includes the steps of scanning the image to detect the structure, tracing the structure to produce primitives for the plurality of edges, producing, for the inspected structure, a set of high level descriptors referred to as inspection grammar, and comparing the inspection grammar to a defect-free grammar representative of a defect-free structure or portion thereof.

Depending on the type of image-capturing device utilized, the method may also include the step of converting the image into a pixel-based image. The defect-free grammar may be created from a computer aided design description of the structure, or by processing an image of a defect-free structure.

The method continues by storing the defect-free grammar in a knowledge base, and storing an inspection grammar in a knowledge base as a defect grammar when the inspection grammar differs from the defect-free grammar. The defect grammars are then organized by defect type. The method continues by performing Automatic Defect Classification on the production grammar.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF A PREFERRED EMBODIMENT

The present invention provides a system and method of optically inspecting structures on the surface of an object. The preferred embodiment is described as a system and method of optically inspecting photoresist structures on the surface of semiconductor wafer dice, and reliably tracing the edges of these structures. Accordingly, the present invention detects and measures the lengths of structure edges. By utilizing image structure grammars (i.e., sets of high level descriptors describing entire structures), the present invention is faster than, and solves the problems associated with, prior art optical inspection techniques.

Anomaly Detection/Location System

Figure 1:
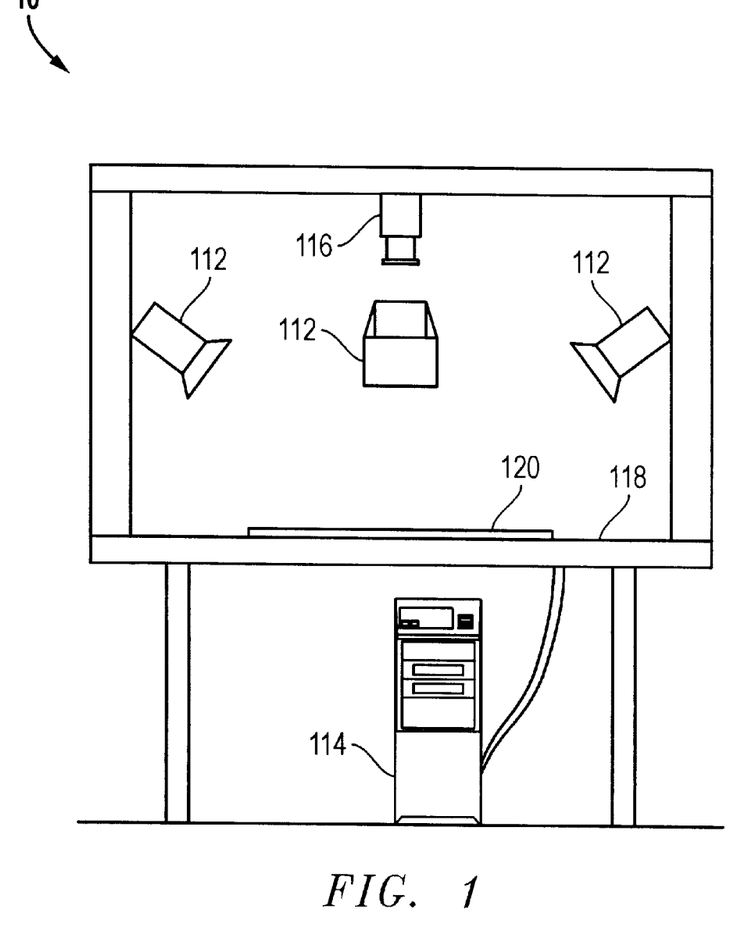
FIG. 1 is a front view of the system of the present invention in an embodiment for inspecting semiconductor wafers.
Figure 1A:
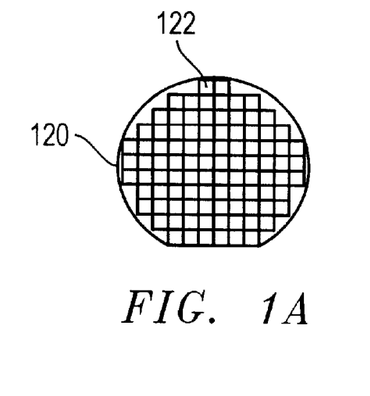
FIG. 1A is a top-plan view of the wafer of FIG. 1 illustrating a plurality of dice.
Figure 1B:
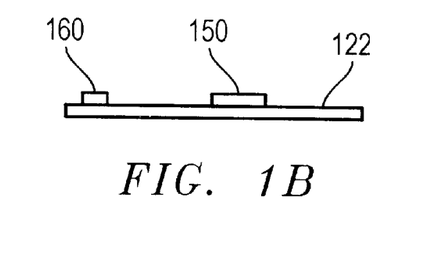
FIG. 1B is an enlarged side elevational view of a die of FIG. 1A illustrating two photoresist structures thereon.

FIG. 1 is a front view of the system of the present invention in an embodiment for inspecting semiconductor wafers. The system 10 may be utilized to detect and locate photoresist anomalies. The anomaly detection/location system 10 comprises light sources 112, a control computer 114, an image capturing device 116, and a wafer support 118 which holds a wafer 120. FIG. 1A is a top-plan view of the wafer 120 of FIG. 1 illustrating a plurality of dice such as die 122. FIG. 1B is an enlarged side elevational view of the die 122 of FIG. 1A illustrating two photoresist structures (photoresist islands 150 and 160) thereon.

The light sources 112 may emit light or energy on the surface of the wafer utilizing, for example, laser light, X-rays, ion beams, electrons, or light in the infrared, ultraviolet, or visible spectrum. The efficiency of the present invention and its ability to detect structure edges, such as photoresist island edges, is largely dependent upon the production of crisp, sharp component edges under the image capturing device 116. Therefore, the light sources 112 are preferably coherent light sources which minimally diffuse emitted light. The image capturing device 116 is preferably a single line-scan or area-scan overhead camera. A suitable image capturing device is the XC003 3CCD (Charge Coupled Device) Area-Scan Color Camera available from the Sony Corporation.

It should be understood that in some instances the detection of structure shadow edges will be preferable to the detection of actual structure edges. One such method of creating shadows is described for positioning a robot arm in U.S. Pat. No. 4,873,651 to Raviv. Another method of creating, detecting and processing component shadows is described in co-owned and co-pending U.S. patent application Ser. No. 09/074,301 entitled "System and Method of Optically Inspecting Manufactured Devices", which is hereby incorporated by reference in its entirety.

Image Decomposition

U.S. patent application Ser. No. 08/867,156 to YouLing (the parent of the present Continuation In Part application) discusses a method of image decomposition. For clarity, the method of image decomposition disclosed by YouLing is briefly discussed below. However, it should be understood that any method of image decomposition can be incorporated into the present invention to produce grammars and gradients (as discussed later).

Figure 2:
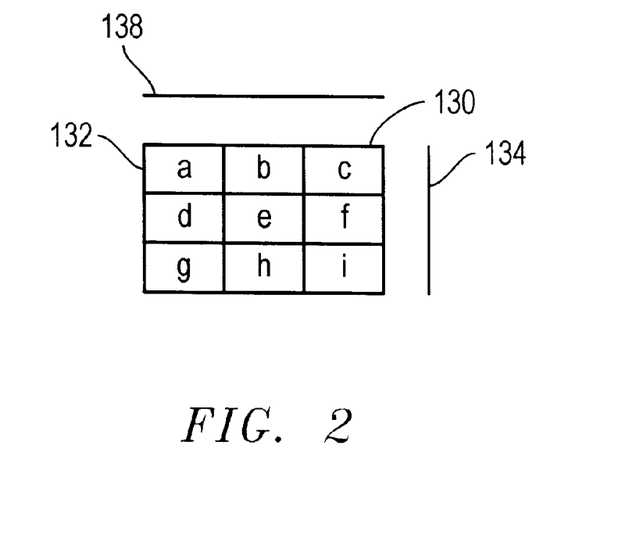
FIG. 2 is an illustrative drawing of a decomposition window according to the present invention.

FIG. 2 is an illustrative drawing of a decomposition window 130 according to the present invention. The decomposition window comprises a multiplicity of cells 132a–132i (nine cells arranged in a three-by-three matrix). Each cell 132a–132i detects a light intensity of a corresponding pixel and transfers the information to the structure anomaly detection/location system 10. A cell location in the decomposition window 130, when matched with the information gathered by the other cells in the decomposition window 130, provides the structure anomaly detection/location system with the information needed to calculate the locations of structure edges. An image which has been captured by the image capturing device 116 and then digitized by a digitizer (not shown) is referred to as a captured area.

Figure 3:
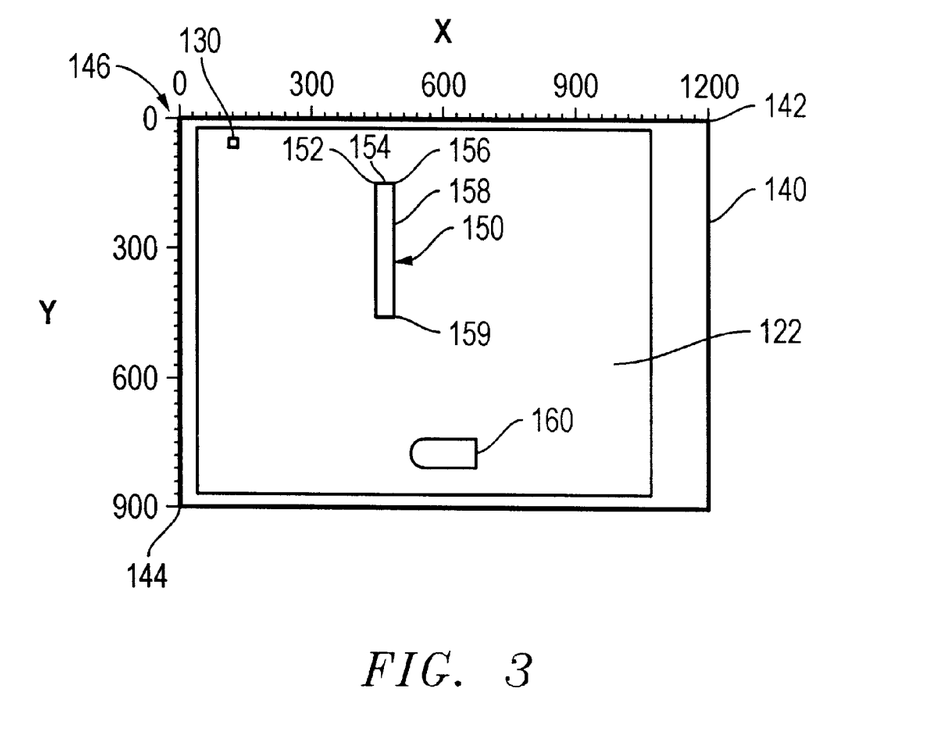
FIG. 3 is an illustrative drawing of a captured area of a wafer surface having photoresist islands superimposed upon a grid having a X-axis and a Y-axis.

FIG. 3 is an illustrative drawing of a captured area 140 of a wafer surface having a die 122 and structure islands such as photoresist islands 150 and 160 superimposed upon a grid 146 having a X-axis 142 and a Y-axis 144. The decomposition window 130 is also shown. Each axis has its origin (0 point) in the upper left-hand corner of grid 146, and each point along each axis represents the number of pixels located at that point across that axis in the captured area 140. Here, there are 1200 pixels across the X-axis 142, and 900 pixels down the Y-axis 144. For illustrative purposes, the first island 150 is shown to have a first corner 152, a first line segment 154, a second corner 156, a second line segment 158, and a third corner 159.

The image capturing device 116 is utilized to capture an image of the structures on the wafer die 122. If the image is an analog image, it is converted into a digital (pixel) format by a digitizer (not shown). Decomposition window 130 has a default search pattern for locating shadows within the captured area 140. Typically the search pattern comprises a series of scans, beginning in one corner of the captured area 140 and proceeding step-wise through the captured area 140 so as to scan the entire captured area 140. For the preferred embodiment, decomposition window 130 begins the series of scans by passing from the upper left-hand corner (0,0) and proceeding in the positive X direction along the X-axis 142 (from left to right for the orientation shown) in pixel increments until the end of the X-axis 142 of the captured area 140 is reached. Next, the decomposition window 130 returns to the left edge of the captured area 140 and increments down the Y-axis 144 by the height 134 of the decomposition window 130 and again begins passing from left to right in the positive X-axis direction. This search pattern is continued until a portion of a structure is detected by the decomposition window 130.

A structure such as a photoresist island is detected by decomposition window 130 when a cell in the decomposition window detects an area with a light intensity that differs from the light intensity of the bare wafer surface. The anomaly detection/location system 10 recognizes the different light intensity as an edge of a photoresist structure. When a photoresist structure is detected, the decomposition window then traces the photoresist structure (as discussed below), and returns to the point where the trace began so that the window may continue its scan according to the described pattern. The scan is continued as if the photoresist structure no longer exists (i.e. the photoresist island is "masked" and will not be traced a second time). Thereafter, this pattern continues until the entire die is scanned. For illustrative purposes, the tracing of the first island 150 will be discussed later in the Building Grammar section.

A primitive is a unit of image information. For a line segment, a common primitive includes a start point, an end point, the light intensity to the left of the line segment, and the light intensity to the right of the line segment. Thus, the image structure grammar completely describes the structure of the photoresist or other materials which may be detected (such as metal or polyamide deposited on the wafer surface) in terms of a small number of numeric primitives. For example, a rectangular photoresist island has an island structure grammar which articulates coordinates of the corners of the photoresist island and the light intensity of that photoresist island in a form such as: [0,0 0,100 100,100 100,0 5] where the commas separate x,y coordinates of photoresist island corners and the number 5 represents the light intensity detected within the boundary defined by the series of x,y coordinates (the intensity of the light reflected off the photoresist structure).

The edge of a structure in an image may be located by detecting a gradient, which is defined as the change, or difference, between the intensity of the light reflected from the structure and the intensity of the light reflected from the bare wafer surface. Typically, a gradient is detected across an edge, such as a photoresist or metal island edge, and is consistent in a linear pattern along the detected edge.

Using the previous values generated in the Image Decomposition section, the uncoated area of the wafer 120 has a light intensity value of 20 while the area of the wafer coated with photoresist has a light intensity value of 5. To produce a structure gradient, the light intensity value just outside the structure (e.g., the uncoated bare wafer intensity value of 20) generated by light sources 112 is subtracted from the light intensity value of the structure. Thus, the gradient across the structure edges is 15. Additional primitives which record the island structure area, general shape, position, skew and other characteristics may be used to provide additional definition and more precise structure descriptions. The same method may be applied to structures created by etching, sputtering, or with focused ion beams.

The collection of primitives which completely describes a structure is called the structure's "grammar." Thus, grammar may be thought of as a symbolic representation of a structure. In general, a structure is said to have a "structure grammar;" likewise, an island is said to have an "island grammar." Of course, other structures will have different descriptive grammar names. U.S. Pat. No. 5,515,453 to Hennessey, et al. discusses in detail how a grammar may be generated from primitives or a Computer Aided Drafting (CAD) file, and is hereby incorporated by reference herein in its entirety.

Building Grammar

The construction of a structure grammar may be understood by way of an illustration that builds an island grammar for a structure island in the captured area 140. Scanned area 140 has a first structure island 150, and a second structure island 160. Upon reaching a first corner 152 of the first island, decomposition window 130 senses the light intensity of the first island and begins tracing the first island in the direction of a first line segment 154, while searching for a change in the light intensity which may signal the end of the first line 154.

Upon reaching a second corner 156, cells in the decomposition window 130 sense a change in the light intensity that matches a predetermined threshold which indicates that the end of the line segment 154 has been reached. Thereafter, line segment 154 is considered a single line segment for decomposition purposes. For the line segment 154 the start point is approximately (450, 150) and the end point is approximately (480, 150).

While moving from the start point to the end point, the decomposition window 130 detects and the anomaly detection/location system 10 records the light intensity around the line segment 154. Above (to the left of) line segment 154, a light intensity value of 20 or more is detected, indicating that a lighted bare wafer area is detected. Below (to the right of) the line segment 154, a light intensity of 5 or less is detected, indicating that a photoresist area is present. The method of following the line segment is briefly discussed below. In general, the decomposition window traces a line segment until a change in light intensity is detected by a cell. A change in intensity may result from a cell detecting structure elements not previously accounted for, or no longer detecting structure elements where structure was initially detected. Upon reaching the corner 156, the decomposition window 130 senses a change in light intensity (to the lighted bare wafer light intensity value, 20), thus signaling an end to line segment 154. The appropriate primitive information for the line segment 154 is then recorded and stored.

A trace program directs the movement of the decomposition window around corners. For example, if decomposition window 130 detects a light intensity 5 indicating structure in cells 132*d*, 132*e*, 132*g*, and 132*h*, and detects a light intensity 20 indicating lighted bare wafer surface in cells 132*a*, 132*b*, 132*c*, 132*f*, and 132*i*, the anomaly detection/location system 10 knows that a corner (here, specifically, the second corner 156) has been reached. The system also knows that the next line segment continues down in the positive Y-axis direction. The decomposition window then continues tracing along the line segment 158 until it detects the next corner 159 by detecting a change in light intensity. The trace program then records the appropriate primitives which describe line segment 158. The decomposition window is programmed to find and continue tracing the edge of the first island 150 until the decomposition window again reaches the corner 152 of the first island where the trace originated.

If no corner is detected within the decomposition window 130, and the decomposition window no longer detects a light intensity change, the window may continue along the same path (here, along the X-axis) for a predefined number of steps, based on predetermined programming. Then, if no appropriate change in light intensity is found along the path, the window may retrace its path and scan in a direction perpendicular to the initial path (here, along the Y-axis) for a predefined number of Y-axis steps, in an attempt to detect a change in light intensity indicative of the photoresist light intensity. Unless the decomposition window is at the first corner of the trace, the decomposition window should detect a new island segment in the scan. If at any time the decomposition window is unable to complete a trace of the border of a structure island, it traces as much as possible, and then returns to where the trace originated and continues the scan pattern.

Sometimes, only information regarding one line segment is desired, as in the case of detecting only one structure island edge, and so only that edge is traced. At other times it is desired to trace an entire island. Table 1 lists the information gathered by tracing line segments 154, 158, 162, and 164 of the first island 150.

TABLE 1

| Primitive | Start | End | Left | Right | Gradient |
|---|---|---|---|---|---|
| Line segment 154 | 450,150 | 480,150 | 20 | 5 | 15 |
| Line segment 158 | 480,150 | 450,450 | 20 | 5 | 15 |
| Line segment 162 | 480,450 | 450,450 | 20 | 5 | 15 |
| Line segment 164 | 450,450 | 450,150 | 20 | 5 | 15 |

Table 1 illustrates how primitives (here, rows) are grouped into sets to create the grammar for the post-imaging processing of the first island 150 of die 122.

After having decomposed the line segments into primitives as shown in Table 1, the anomaly detection/location system 10 masks the location of the island 150 and begins searching for additional structure islands where the first corner 152 was detected. Because of masking, the next point that the decomposition window detects is a corner of the second island 160. The anomaly detection/location system then traces the second island 160 as described above. Afterwards, the trace again continues to scan as described above, eventually terminating at the bottom right-hand corner of the captured area 140. When the entire die 122 is traced, the anomaly detection/location system 10 has then produced the grammars required to completely describe the die 122, and it proceeds to detect additional dice. It should be understood that structure comparison can be accomplished with as little as a single primitive, such as a line segment.

Multiple Image Processing

The present invention enhances the quality of the structure grammar by processing multiple images of the object and the structures thereon. In typical wafer inspection systems, for example, wafers to be inspected are supported on a moving platform (stage) which moves the wafers in multiple directions and dimensions past the inspection station. In such a system, as the wafer moves past the image capturing device (camera) 116 (FIG. 1), there is the opportunity to capture multiple images of the wafer. For example, the camera may take 10 images of the wafer, providing 10 times the data to refine the structure grammar. However, since the structures being imaged are extremely small, any vibrations or wobble in the stage will result in bad data due to erroneous or inconsistent structure locations being imaged. Wobble of the stage may result in slight rotations of the structure around a vertical axis. It is extremely expensive to implement a system for moving the stage which eliminates vibration and wobble at microscopic levels. Therefore, the present invention utilizes a method of adjusting out the effects of vibration and wobble so that the benefits of multiple image processing can be realized.

Figure 4A:
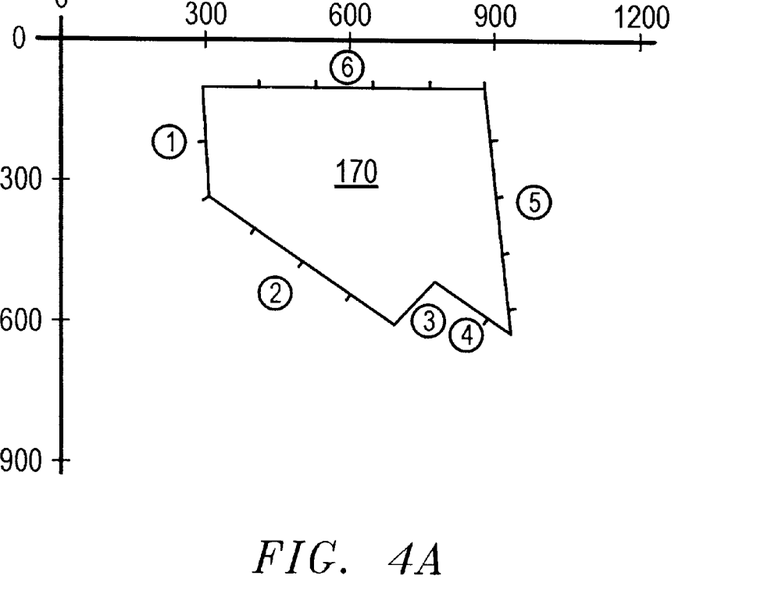
FIG. 4A is an illustrative drawing of a decomposition window showing a structure which is to be processed to generate structure grammar.

The adjusting method, referred to as "alignment", utilizes histograms to adjust for vibration and wobble. FIG. 4A is an illustrative drawing of a decomposition window showing a structure 170 which is to be processed to generate structure grammar. After the edges of the structure are traced utilizing the process described above, the slope and length of each side is computed and stored. Table 2 below is an exemplary record of the slope and length of each side of the structure 170 of FIG. 4A.

TABLE 2

| SIDE | SLOPE | LENGTH |
|------|-------|--------|
| 1 | 88° | 2 |
| 2 | 43° | 4 |
| 3 | 137° | 1 |
| 4 | 46° | 1.5 |
| 5 | 89° | 4.5 |
| 6 | 180° | 5 |

If ten images of the structure are captured, similar data is generated for each of the ten images.

Figure 5A:
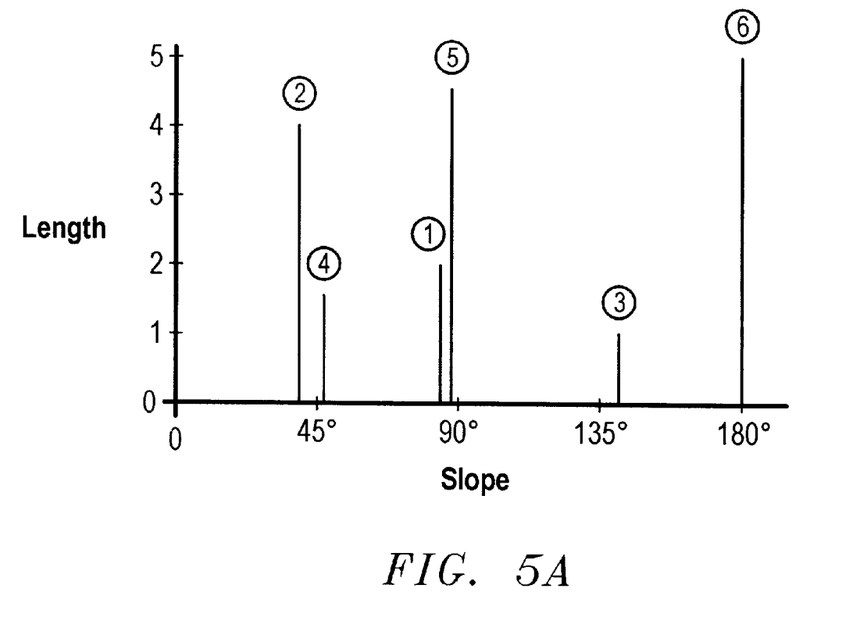
FIG. 5A is a histogram which graphically represents the data generated from the structure of FIG. 4A.

Once this data is generated, it is then graphically represented on a histogram. FIG. 5A is a histogram which graphically represents the data generated from the structure 170 of FIG. 4A. The lengths of the lines along the vertical axis are representative of the lengths of the sides of the structure, and the lines are placed along the horizontal axis at the angles corresponding to the slopes of the sides.

Figure 4B:
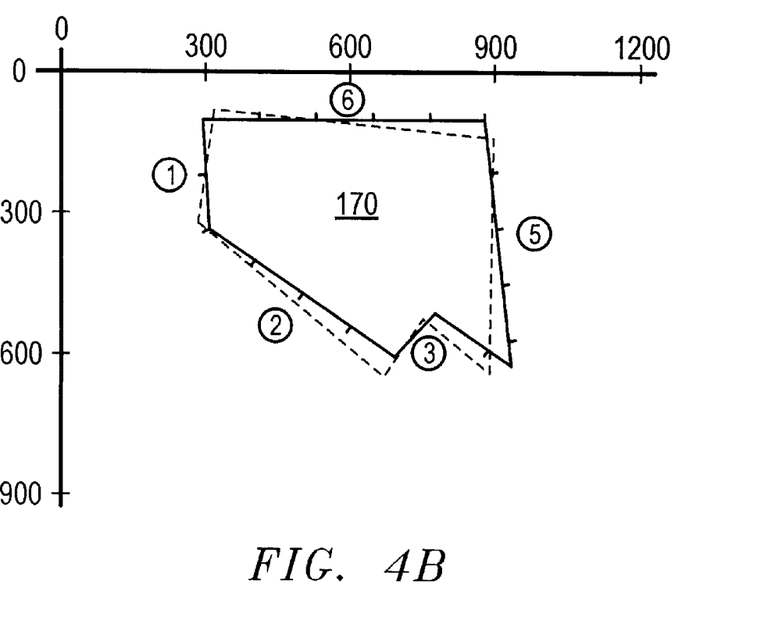
FIG. 4B is an illustrative drawing of a decomposition window showing in phantom the structure of FIG. 4A captured in a subsequent image, when the structure is rotated due to wobbling of the conveyor support.

FIG. 4B is an illustrative drawing of a decomposition window showing in phantom the structure 170 of FIG. 4A captured in a subsequent image, when the structure is rotated due to wobbling of the inspection platform. The shape of the structure, of course, is not affected; however, the slope of each side is uniformly rotated in either the positive or negative direction. In FIG. 4B, the slope has been positively rotated.

Figure 5B:
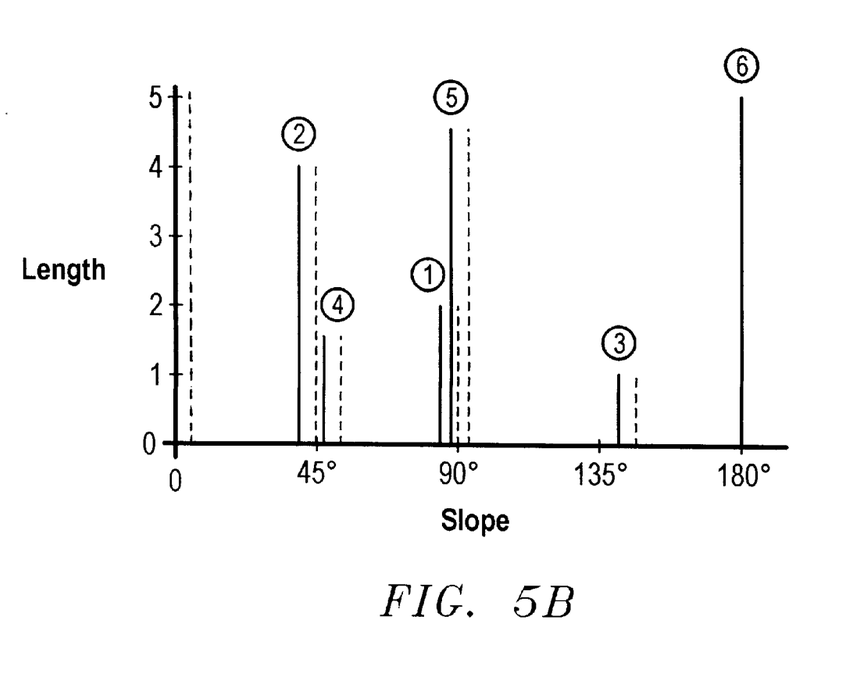
FIG. 5B is a histogram which graphically represents in phantom the data generated from the image of the rotated structure of FIG. 4B.

FIG. 5B is a histogram which graphically represents in phantom the data generated from the image of the rotated structure 170 of FIG. 4B. The rotation of the structure is reflected in a shift of each of the vertical lines in the positive direction along the horizontal axis. The present invention recognizes this uniform shift of each of the lines as resulting from wobble, and adjusts the slope angles of the lines to align the image with the previous image. Similarly, if there is a difference in magnification between a first image and a second, the histogram of the second image will include lines that are uniformly shorter or longer than the lines of the first image. Once again, the present invention recognizes this uniform change in line length as resulting from a magnification change, and adjusts the line lengths to align the second image with the first image.

Figure 6:
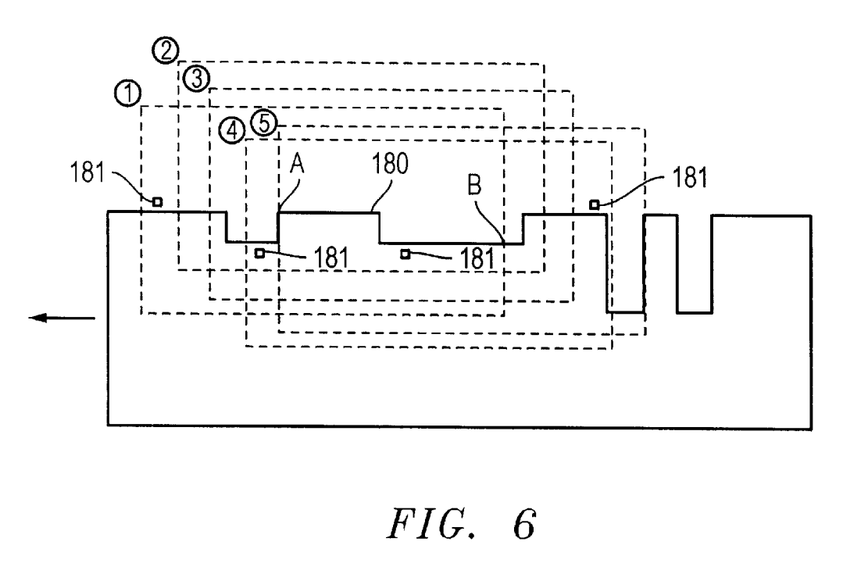
FIG. 6 is an illustrative drawing of a structure edge which appears in a plurality of images which are utilized for multiple image processing in the present invention.

FIG. 6 is an illustrative drawing of a structure edge 180 which appears in a plurality of images 1–5 which are utilized for multiple image processing in the present invention. As the structure edge is moved to the left on its stage, a plurality of images are sequentially taken of the edge by the camera 116 (FIG. 1). Thus, as shown in FIG. 6, the sequence of images appears to move along the structure edge in the opposite direction of structure movement, with each image in the sequence covering a slightly different area of the structure edge. Due to the wobble of the stage, the images not only progress along the axis of structure movement, but also deviate in the transverse direction. The alignment method described above accounts for the wobble and aligns the images for multiple image processing without having to implement an expensive system for moving the stage which eliminates vibration and wobble at microscopic levels.

Multiple image processing enables the present invention to enhance the quality of the structure grammar by processing multiple images of the object and the structures thereon. Resolution is increased by increasing the number of images processed. For simplicity of illustration, five images are illustrated in FIG. 6, and it can be seen that edge segment A–B appears in all five images. By increasing the number of images processed up to, for example, ten (10) images of a structure edge, resolution on the order of 0.15 to 0.25 microns is achievable. In addition, anomalies 181 may appear in individual images, and inspection systems which utilize only one image of the object may interpret such anomalies as part of the structure edge. However, by processing multiple images, the present invention reduces the number of falsely reported anomalies since anomalies that appear in, for example, only one of 10 images, are discarded as noise.

Implementing the Method

Figure 7A:
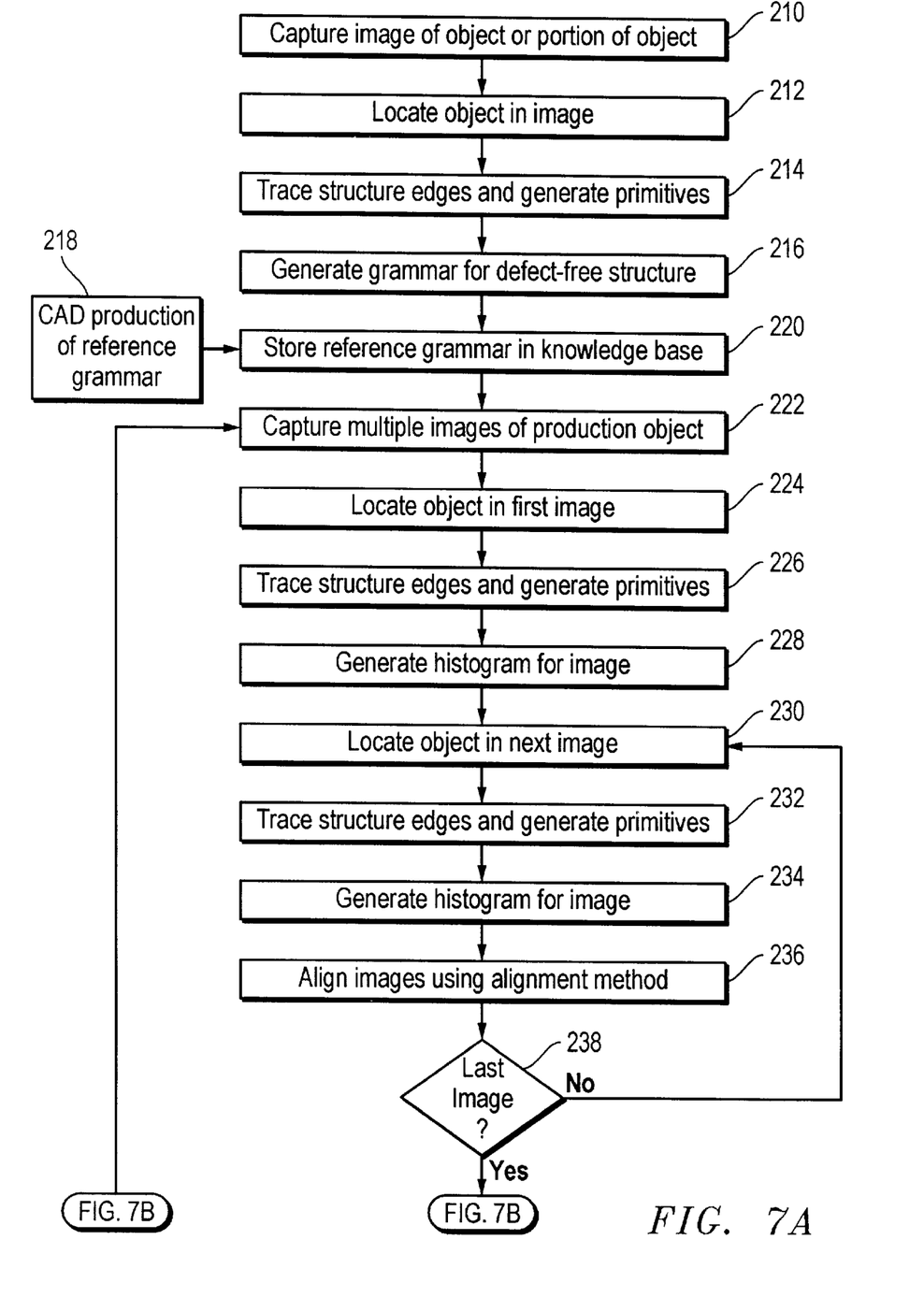
FIGS. 7A–7B are a flow chart illustrating the steps of a method of the present invention.
Figure 7B:
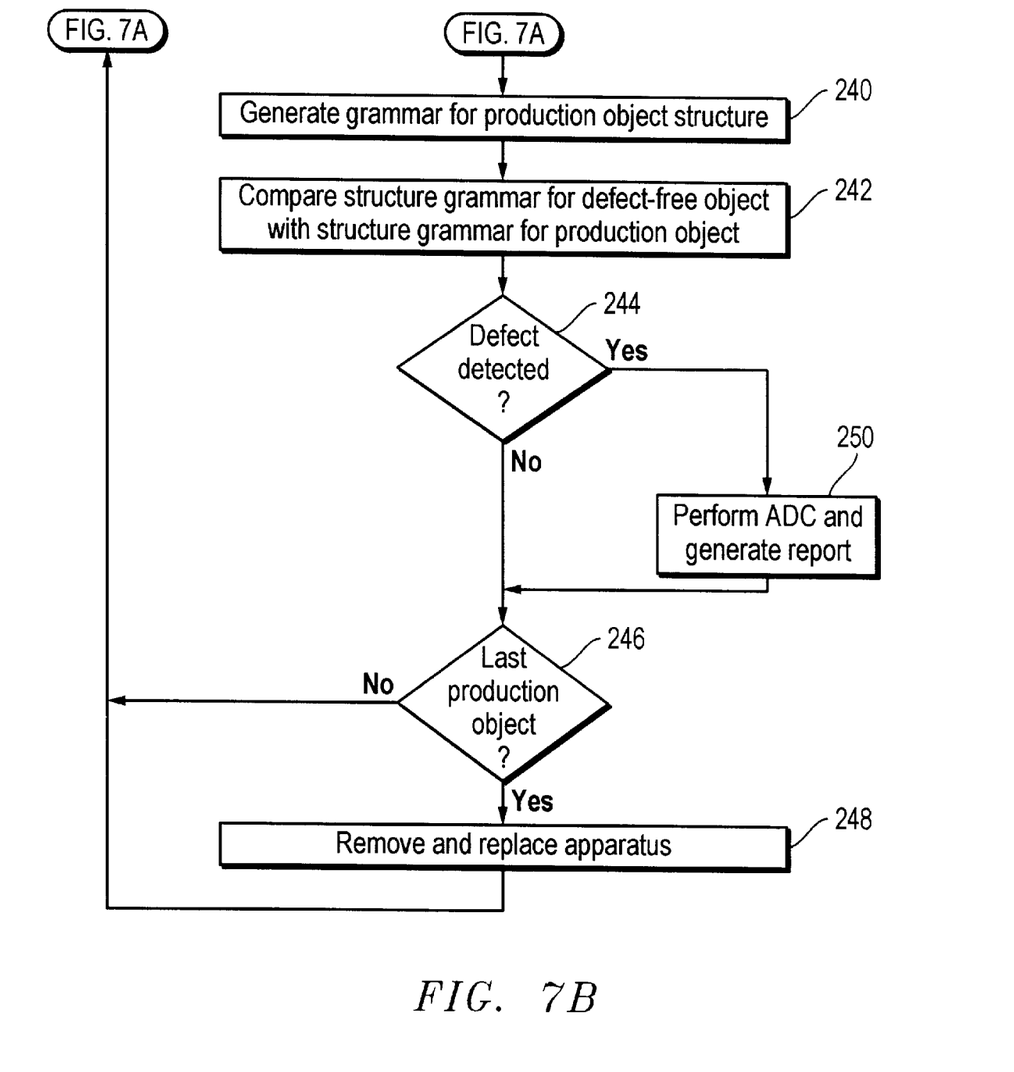

FIGS. 7A–7B are a flow chart demonstrating a method of practicing the present invention where the grammar created from the captured image of the structure islands for a production wafer is compared with stored reference grammar which is generated either from a captured image of properly constructed structure islands, or from CAD. Unless a repeated structure is available within the image of the structure, a reference structure grammar for a defect-free object is needed to benchmark the structure grammar for production objects.

To construct a reference structure grammar for a defect-free object (one which has been previously examined and determined to be defect-free), the light sources 112 are activated to illuminate an object having defect-free structures thereon. Referring to FIG. 7A, an image of the object, or a portion of the object, is captured in a first image capturing step 210. Next, at step 212, the anomaly detection/location system 10 locates the object having the defect-free structures in the captured image. The system then scans the captured image of the defect-free object as discussed in the Image Decomposition section, by tracing structure edges and generating primitives at 214. At step 216, the primitives are organized to generate the reference structure grammar for the defect-free object. If CAD is utilized to build reference structure grammar, a CAD data file or CAD image of a defect-free object is utilized at step 218 to produce primitives and structure grammar for a defect-free object.

At step 220, the reference grammar generated from the captured image or CAD information is stored in the knowledge base. The knowledge base is utilized later by the system control computer 114 to retrieve grammars for comparing a production structure grammar with a defect-free reference structure grammar to detect structural defects. The production structure grammar may also be compared with pre-selected defective structure grammars to classify the structural defects.

At step 222, the primary light sources 112 are activated, and a series of images of a production object structure are captured. Thereafter, for each image, the object is detected, and the anomaly detection/location system creates structure primitives by tracing structure edges. At step 224, the object is located in the first image, and the first image is scanned, the structure is traced, and primitives are generated at 226. The primitives are then utilized to generate a histogram at 228.

This process is then repeated for the next image in the series. At step 230, the object is located in the second image. The second image is then scanned, the structure is traced, and primitives are generated at 232. The primitives are then utilized to generate a histogram at 234. The alignment method described above is then utilized at step 236 to align the first image with the second image. At step 238, it is determined whether the second image is the last image in the series. If not, the process returns to step 230, locates the object in the next image, and repeats the procedure to generate and align the histogram for the next image. This process is repeated until each image in the series has been aligned with previous images in the series. When it is determined at step 238 that the last image in the series has been scanned and aligned, the method then moves to FIG. 7B.

At step 240 of FIG. 7B, structure grammar is generated from the primitives from the aligned images. In a comparison step 242, the structure grammar for the defect-free object and the structure grammar for the production object are compared primitive by primitive, and any differences are stored in the knowledge base. Ideally, the numerical difference between the production structure gradients and the defect-free structure gradients is zero. However, some adjustments may be made to account for minor differences in illumination by configuring the system to accept non-zero values (for example, a gradient difference of one) as defect-free.

Accordingly, at step 244 it is determined whether or not a defect was detected. If no defect is detected, the method proceeds to step 246 where it is determined if the inspected object is the last production object associated with a particular apparatus to be inspected. If additional objects need to be evaluated, the next object is detected, and the process proceeds by returning to step 222 of FIG. 7A. If the object is the last object to be inspected, the apparatus is removed from the anomaly detection/location system 10 and another production apparatus or object is loaded into the system at step 248. The process then returns to step 222 and captures a series of images of a next production apparatus or object structure.

If any defects are detected at step 244, the method performs Automatic Defect Classification (ADC) at step 250 and generates a report.

For example, if the difference between the production structure gradient and the defect-free structure gradient is 20, this is an indication that a structure is missing. ADC classifies structure defects utilizing a defect list which is stored in the knowledge base. The defect list is a collection of known and possible structure grammars and gradients that indicate that a structure defect has been detected. Any defects not presently in the defect list are added to the defect list in the knowledge base for future reference.

The method then proceeds to step 246 which is executed as discussed above.

A method of practicing ADC through grammar comparison is described in further detail in co-owned U.S. patent application Ser. No. 08/603,026 which is hereby incorporated herein by reference in its entirety. Another method of automatically classifying object anomalies is described in co-pending and co-owned U.S. patent application Ser. No. 08/347,020, filed Nov. 30, 1994, entitled "Apparatus and Method for Automatic Knowledge-Based Object Identification", which is hereby incorporated by reference in its entirety. The method discussed creates a pixel map from a captured image and converts the pixel map into primitives. The pixel map and primitives are then converted into a set of high level descriptors (such as grammar) based on relevant features such as shape, color, sharpness, and texture. These descriptors are compared to stored sets of descriptors to classify the object or anomaly, and to update the database of stored descriptors.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for inspecting structures on a surface of an object, said system comprising:

a support which supports the object, said object having a structure on the surface thereof;

a device which emits energy onto the surface of the object for illuminating the surface and the structure;

an image capturing device mounted adjacent to the object which captures an image of the illuminated surface of the object and the structure; and a computer which generates a structure grammar for the entire structure from the image.

2. The system of claim 1 wherein the device which emits energy is selected from the group consisting of a visible light source, an infrared light source, an ultraviolet light source, an X-ray source, a focused ion beam source, and an electron source.

3. The system of claim 1 wherein the image capturing device is selected from the group consisting of a line-scan camera and an area-scan camera.

4. The system of claim 1 wherein the computer includes:

means for comparing the structure grammar generated from the image to a reference structure grammar for a defect-free object; and means for recording any differences between the structure grammar generated from the image and the reference structure grammar.

5. The system of claim 4 wherein the reference structure grammar for the defect-free object is generated from computer aided drafting.

6. The system of claim 4 wherein the reference structure grammar for the defect-free object is generated from an image of a defect-free object.

7. The system of claim 1 further comprising a knowledge base accessible by the computer for receiving and storing reference structure grammar.

8. The system of claim 4 wherein the computer performs Automatic Defect Classification (ADC) for classifying any differences between the structure grammar generated from the image and the reference structure grammar.

9. A method of inspecting a photoresist structure on a top surface of a semiconductor wafer die, said photoresist structure having a plurality of edges, the method comprising the steps of:

shining a light on the wafer having the die thereon, said light illuminating the top surface of the wafer and the die so as to clearly expose the plurality of edges of the photoresist structure;

capturing an image of a portion of the wafer having the die thereon;

detecting a die image within the captured image;

scanning the die image to detect the photoresist structure;

tracing the photoresist structure to produce primitives for the plurality of edges of the photoresist structure, thereby producing a production grammar; and comparing the production grammar to a defect-free grammar representative of a defect-free die.

10. The method of claim 9 further comprising the step of converting the image into a pixel based image.

11. The method of claim 9 further comprising the step of producing a defect-free grammar by processing a computer aided drafting image of a defect-free die.

12. The method of claim 9 further comprising the step of producing a defect-free grammar by processing an image of a defect-free die.

13. The method of claim 9 further comprising the step of storing the defect-free grammar in a knowledge base.

14. The method of claim 9 further comprising the step of storing a production grammar in a knowledge base as a defect grammar when the production grammar differs from the defect-free grammar.

15. The method of claim 14 further comprising the step of organizing the defect grammar by a defect type.

16. The method of claim 9 further comprising the step of performing an Automatic Defect Classification on the production grammar.

17. A method of inspecting a structure on a surface of a production object, said structure having a plurality of edges, said method comprising the steps of:

emitting energy onto the surface of the object to illuminate the surface and the structure;

capturing, with an image capturing device, a plurality of sequential images of the illuminated surface of the object and the structure;

tracing the edges of the structure to generate primitives for each edge;

creating a histogram for each of the plurality of images, the histogram identifying a slope and a length of each edge of the structure as captured in each of the images;

aligning the images by aligning the histograms for the plurality of images;

generating a production structure grammar from the aligned images; and comparing the production structure grammar with a reference structure grammar generated from a defect-free object to identify any defects on the production object.

18. The method of inspecting a structure on a surface of a production object of claim 17 wherein the object is supported on a moving platform while the images are captured, and the step of aligning the images by aligning the histograms for the plurality of images includes adjusting for wobble of the moving platform, said step of adjusting for wobble including the steps of:

comparing the slopes of the edges of the structure in two different histograms to identify differences in the slopes;

determining whether the differences in the slopes are a change in the slopes which is common to all edges; and adjusting the slopes to be equal in each image upon determining that the differences in the slopes are a change in the slopes which is common to all edges.

19. The method of inspecting a structure on a surface of a production object of claim 18 wherein the step of aligning the images by aligning the histograms for the plurality of images includes adjusting for differences in magnification between the images, said step of adjusting for differences in magnification including the steps of:

comparing the lengths of the edges of the structure in two different histograms to identify differences in the lengths;

determining whether the differences in the lengths are a change in the lengths which is common to all edges; and adjusting the lengths to match in each image upon determining that the differences in the lengths are a change in the lengths which is common to all edges.

* * * * *